(12) United States Patent
Kim et al.

(10) Patent No.: US 8,526,193 B2
(45) Date of Patent: Sep. 3, 2013

(54) DISPLAY APPARATUS AND METHOD OF FABRICATING THE SAME

(75) Inventors: Dae Hyun Kim, Suwon-si (KR); Jae Byung Park, Seoul (KR); Chun-Ho Song, Seoul (KR); Donchan Cho, Seongnam-si (KR); Sungsik Yun, Suwon-si (KR); Yu-Kwan Kim, Incheon (KR)

(73) Assignee: Samsung Display Co., Ltd. (KR)

( * ) Notice: Subject to any disclaimer, the term of this patent is extended or adjusted under 35 U.S.C. 154(b) by 138 days.

(21) Appl. No.: 13/273,049

(22) Filed: Oct. 13, 2011

(65) Prior Publication Data

US 2012/0229966 A1 Sep. 13, 2012

(30) Foreign Application Priority Data

Mar. 8, 2011 (KR) .................. 10-2011-0020517

(51) Int. Cl.
*H05K 7/00* (2006.01)

(52) U.S. Cl.
USPC .............. 361/760; 361/679.01; 361/679.02; 361/749

(58) Field of Classification Search
USPC ................ 361/760, 679.01, 679.02, 749
See application file for complete search history.

(56) References Cited

U.S. PATENT DOCUMENTS

| | | | |
|---|---|---|---|
| 6,275,320 B1 | 8/2001 | Dhuler et al. | |
| 6,775,048 B1 | 8/2004 | Starkweather et al. | |
| 7,271,945 B2 | 9/2007 | Hagood et al. | |
| 7,304,785 B2 * | 12/2007 | Hagood et al. | 359/290 |
| 7,417,782 B2 | 8/2008 | Hagood et al. | |
| 7,746,529 B2 | 6/2010 | Hagood et al. | |
| 7,852,546 B2 * | 12/2010 | Fijol et al. | 359/291 |

FOREIGN PATENT DOCUMENTS

| | | |
|---|---|---|
| KR | 1020070114161 A | 11/2007 |
| KR | 1020070114162 A | 11/2007 |
| KR | 1020070115965 A | 12/2007 |
| KR | 1020070117599 A | 12/2007 |
| KR | 1020080037072 A | 4/2008 |
| KR | 1020080090397 A | 10/2008 |
| KR | 1020100073051 A | 7/2010 |

* cited by examiner

*Primary Examiner* — Timothy Thompson
*Assistant Examiner* — Andargie M Aychillhum
(74) *Attorney, Agent, or Firm* — Cantor Colburn LLP

(57) ABSTRACT

A display apparatus includes a first substrate and a second substrate. The first substrate includes a light shielding layer including a first opening which transmits a light. The second substrate includes a shutter including a second opening which corresponds to the first opening, and a first flexible electrode part which is connected to one end of the shutter and transmits or blocks the light by moving the shutter. The first flexible electrode part includes a first flexible electrode, a second flexible electrode, and an insulation pattern. The insulation pattern insulates the first flexible electrode and the second flexible electrode from each other, and exposes upper and lower surfaces of the first flexible electrode and the second flexible electrode which are parallel to the second substrate, by covering portions of the first flexible electrode and the second flexible electrode.

9 Claims, 18 Drawing Sheets

DISPLAY APPARATUS AND METHOD OF FABRICATING THE SAME

This application claims priority to Korean Patent Applications No. 10-2011-0020517, filed on Mar. 8, 2011, and all the benefits accruing therefrom under 35 U.S.C. §119, the entire contents of which are hereby incorporated by reference.

BACKGROUND OF THE INVENTION

1. Field of the Invention

The disclosure herein relates to a display apparatus and a method of fabricating the same, and more particularly, to a display apparatus having a microelectromechanical system ("MEMS") shutter and a method of fabricating the same.

2. Description of the Related Art

Examples of currently known display apparatuses include a liquid crystal display ("LCD"), a plasma display panel ("PDP"), an organic emitting light display ("OLED"), a field effect display ("FED"), an electrophoresis display ("EPD"), a MEMS display, etc.

The MEMS display using a micro-shutter among the foregoing display apparatuses has high light-use efficiency and high-speed switching characteristics. Since the micro-shutter has the characteristic of being deformed by an electrostatic force according to the presence of applied electric fields, light may be directly transmitted or blocked according to the operations of the micro-shutter by using the deformation characteristics of the micro-shutter. Therefore, the MEMS display has a high response rate even for an operating voltage having a low voltage level.

BRIEF SUMMARY OF THE INVENTION

The disclosure provides a high-quality display apparatus which can be operated with a low operating voltage.

The disclosure also provides a method of fabricating a high-quality display apparatus in which abnormal operations of a shutter are reduced.

Embodiments of the invention provide a display apparatus including a first substrate and a second substrate.

The first substrate includes a first insulating substrate, and a light shielding layer on the first insulating substrate and including a first opening which transmits a light. The second substrate includes a second insulating substrate which faces the first insulating substrate, a shutter including a second opening which corresponds to the first opening, and a first flexible electrode part which is connected to one end of the shutter and causes the shutter to move such that the light is transmitted or blocked.

The first flexible electrode part includes a first flexible electrode, a second flexible electrode, and an insulation pattern. The first flexible electrode is on the second insulating substrate and a first voltage is applied to the first flexible electrode. The second flexible electrode is on the second insulating substrate. The second flexible electrode is connected to the shutter and faces the first flexible electrode such that the second flexible electrode moves toward the first flexible electrode when the first voltage is applied. The insulation pattern insulates the first flexible electrode and the second flexible electrode from each other, and exposes the upper and lower surfaces of the first flexible electrode and the second flexible electrode which are parallel to the second substrate, by covering portions of the first flexible electrode and the second flexible electrode.

In an exemplary embodiment, the insulation pattern may include at least one of silicon nitride, silicon oxide, and aluminum oxide.

In an exemplary embodiment, the first flexible electrode includes a first flexible beam, and a first support which supports the first flexible beam over the second insulating substrate. The second flexible electrode includes a second flexible beam which faces the first flexible beam, and a second support which supports the second flexible beam over the second insulating substrate. The first flexible beam and the second flexible beam each include a first surface, and a second surface opposing the first surface, which are perpendicular to an upper surface of the second insulating substrate. The second surfaces of the first flexible beam and the second flexible beam face each other. The insulation pattern covers at least one of the first surfaces and the second surfaces.

In an exemplary embodiment, the upper surface and the lower surface respectively connect the first surface and the second surface, and the insulation pattern includes an exposed portion which exposes the upper surface and the lower surface.

In other embodiments of the invention, a method of fabricating a display apparatus includes disposing a first substrate and a second substrate to face each other after fabricating the first substrate and the second substrate.

A first insulating substrate is prepared. A light shielding layer including a first opening is formed on the first insulating substrate to fabricate the first substrate.

A sacrificial pattern is formed on a second insulating substrate. A conductive layer including a conductive material is formed on the sacrificial pattern. The conductive layer is patterned to form a first flexible electrode, a second flexible electrode, and a shutter. An insulation pattern which covers portions of the first flexible electrode and the second flexible electrode, and exposes upper and lower surfaces of the first and second flexible electrodes which are parallel to the second insulating substrate is formed, and then the sacrificial pattern is removed, thereby fabricating the second substrate.

The insulation pattern is formed by forming a first insulation layer including a first insulation material on the second insulating substrate having the first flexible electrode, the second flexible electrode, and the shutter formed thereon, and by anisotropically etching the first insulation layer in a first direction perpendicular to an upper surface of the second insulating substrate. Also, the insulation pattern may be formed by forming a second insulation layer including a second insulation material on the sacrificial pattern before the forming of the conductive layer, and by anisotropically etching the second insulation layer in the first direction.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION OF THE INVENTION

Figure 1:
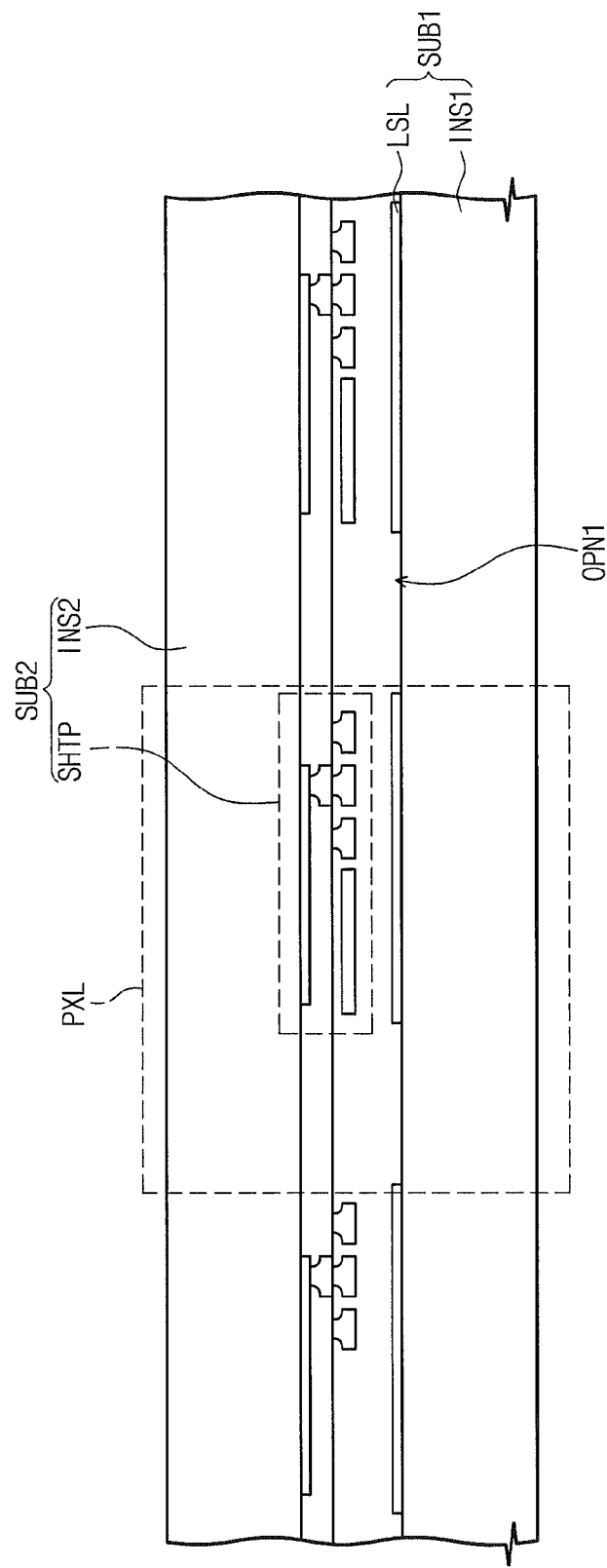
FIG. 1 is a cross-sectional view illustrating an exemplary embodiment of a display apparatus according to the invention.

It will be apparent to those skilled in the art that various modifications and variations can be made in the invention without departing from the spirit or scope of the invention. Therefore, it will be understood that the invention includes all modifications and their equivalents included within the spirit and scope of the invention without limitations to the specifically disclosed shapes.

Like reference numerals refer to like elements throughout. In the drawings, the dimensions of structures are exaggerated for clarity of illustration. It will be understood that although the terms first and second are used herein to describe various elements, these elements should not be limited by these terms. These terms are used only to discriminate one element from another element. For example, an element referred to as a first element in one embodiment can be referred to as a second element in another embodiment. An embodiment described and exemplified herein includes a complementary embodiment thereof. The terms of a singular form may include plural forms unless referred to the contrary.

The meaning of "include," "comprise," "including," or "comprising," specifies a property, a region, a fixed number, a step, a process, an element and/or a component but does not exclude other properties, regions, fixed numbers, steps, processes, elements and/or components. Also, it will be understood that when an element such as a layer, film, region, or substrate is referred to as being "on" another element, it can be directly on the other element or intervening elements may also be present. Further, it will be understood that when an element such as a layer, film, region, or substrate is referred to as being "under" another element, it can be directly under the other element or intervening elements may also be present.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Figure 2:
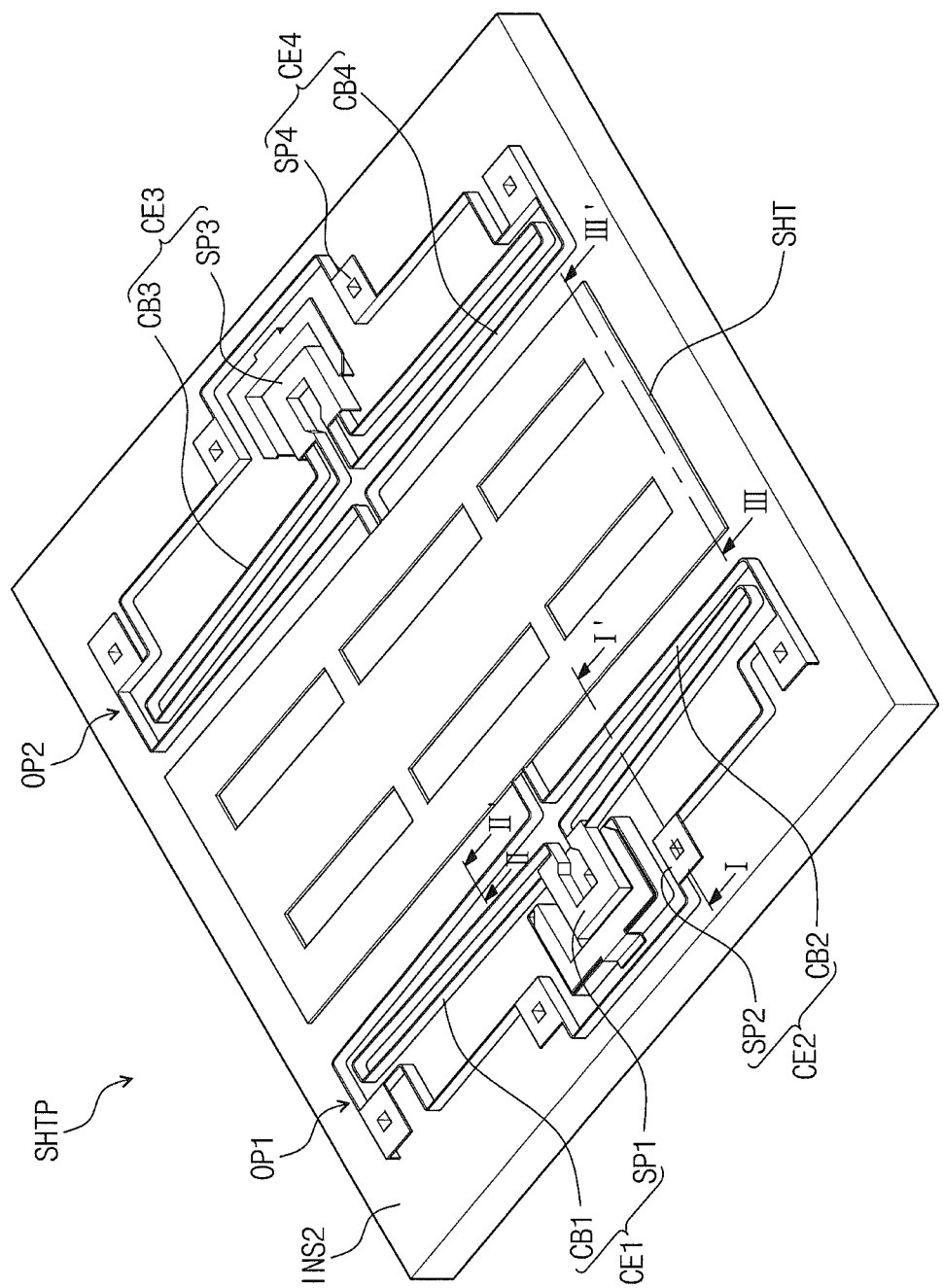
FIG. 2 is a perspective view illustrating an exemplary embodiment of a shutter in the display apparatus of FIG. 1 according to the invention.
Figure 3:
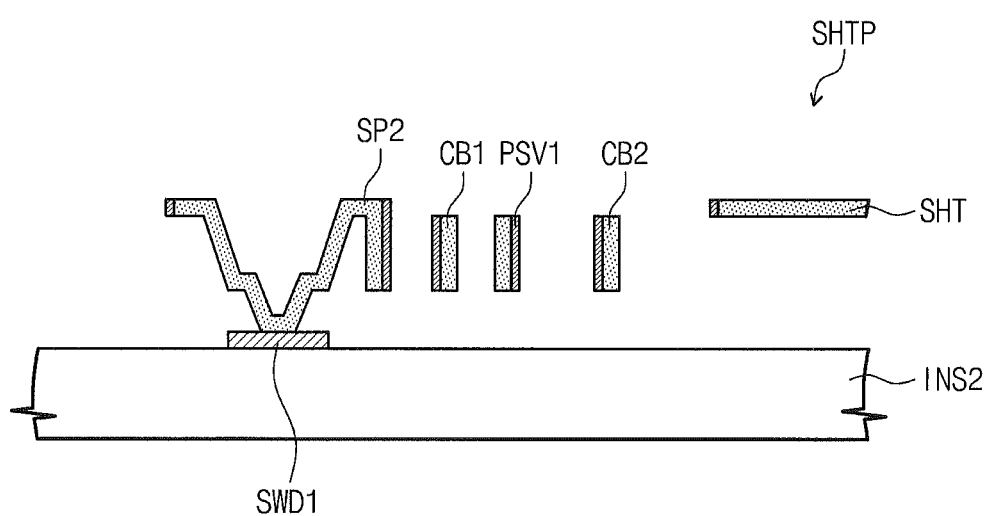
FIG. 3 is a cross-sectional view taken along line I-I' of FIG. 2.

FIG. 1 is a cross-sectional view schematically illustrating an exemplary embodiment of a display apparatus according to the invention, and FIG. 2 is a perspective view specifically illustrating an exemplary embodiment of a shutter in the display apparatus of FIG. 1 according to the invention. FIG. 3 is a cross-sectional view taken along line I-I' of FIG. 2.

Referring to FIG. 1, the display apparatus includes a plurality of pixels PXL. For simplicity of description, a shutter corresponding to only one pixel PXL is illustrated in FIG. 2. However, the pixels PXL are arranged in a matrix form having a plurality of rows and a plurality of columns in an actual display apparatus.

Referring to FIGS. 1 to 3, the display apparatus includes a first substrate SUB1, and a second substrate SUB2 facing the first substrate SUB1.

The first substrate SUB1 includes a first insulating substrate INS1, and a light shielding layer LSL provided on the first insulating substrate INS1.

The first insulating substrate INS1 may include a transparent insulation material such as glass, plastic, and quartz.

The light shielding layer LSL is provided directly on an upper surface of the first insulating substrate INS1. The light shielding layer LSL, which is provided for shielding light from outside the display apparatus, reflects or absorbs the light. In one exemplary embodiment, for example, the light shielding layer LSL may reflect light heading in an upper direction from a lower portion, and may absorb light heading in a lower direction from an upper portion among lights provided from an external light source. Although the light shielding layer LSL may be a single layer, the light shielding layer LSL may be a multi-layered structure including a light reflecting layer and a light absorbing layer. In this case, the light reflecting layer is directly on the first insulating substrate INS1, and the light absorbing layer is on the light reflecting layer. The light reflecting layer may include metal, or may be a dielectric mirror including multilayered dielectrics having different refractive indices. The material of the light absorbing layer is not particularly limited as long as it absorbs light. In one exemplary embodiment, for example, the light absorbing layer may include a mixture of chromium (Cr) and chromium oxide ($CrO_x$).

The light shielding layer LSL includes an opening (hereinafter, referred to as first opening OPN1). The first opening OPN1 may be provided in plural. The first opening OPN1 provides a path for transmitting light from the outside through the light shielding layer LSL. Light traveling to and incident on a portion of the light shielding layer LSL other than the first opening OPN1 is reflected or absorbed by the light shielding layer LSL. Particularly, when a light source (not shown) providing light to the display apparatus is included at one side of the lower portion of the first insulating substrate INS1, the light shielding layer LSL reflects or transmits the light emitted from the light source which travels toward an upper direction from the lower portion.

The first opening OPN1 according to the invention may have various shapes in cross-section and planar views, and a number of the openings OPN1 may also be variously included in the light shielding layer LSL. In one exemplary embodiment of the invention, the number of the first openings OPN1 is six and the first openings OPN1 have two different sizes. However, while the light shielding layer LSL may include first openings OPN1 as shown in the illustrated embodiment, an alternative embodiment may include the first openings OPN1 in different sizes and numbers.

The first opening OPN1 blocks or transmits light from the outside by corresponding to a second opening OPN2 of the shutter SHT. The second opening OPN2 of the shutter SHT will be described later.

The second substrate SUB2 includes a second insulating substrate INS2 and a shutter portion SHTP.

The second insulating substrate INS2 is spaced apart from the first insulating substrate INS1 and faces the first insulating substrate INS 1. The second insulating substrate INS2 may include a transparent insulation material such as glass, plastic, and quartz.

The shutter portion SHTP is provided on the second insulating substrate INS2 and is movable to positions different from each other to transmit or block light as desired. The shutter portion SHTP includes a switching device, a shutter SHT, and a flexible electrode unit.

The switching device of the shutter portion SHTP is provided on the second insulating substrate INS2, and switches the shutter according to image signals. The switching device may include a first switching device SWD1 and a second switching device (not shown) which are operated independently. The switching device may be a thin film transistor connected to signal lines providing the image signals. Although not shown in the drawings, the signal lines may be a gate line and a data line. The thin film transistor is connected to the gate line and the data line, and may transfer a data voltage from the data line to the shutter SHT in response to a gate-on signal of the gate line.

The shutter SHT of the shutter portion SHTP may be a plate shape and is disposed parallel to the second insulating substrate INS2. The shutter SHT includes an opaque material to block light. The shutter SHT has at least one of the second opening OPN2, but may include a plurality of second openings OPN2. The second openings OPN2 are in the same shape, size, and number as the first openings OPN1, and correspond to the first openings OPN1. One embodiment of the invention shows six second openings OPN2 having two different sizes, but the second openings OPN2 are not limited thereto and may have the same or different sizes from each other. Also, the number of the second openings OPN2 may be different from the illustrated embodiment.

The flexible electrode unit of the shutter portion SHTP is connected to the switching device and the shutter SHT, and receives a data voltage from the switching device to move the shutter SHT in a predetermined direction by using electrical attraction and repulsion. The flexible electrode unit includes a first flexible electrode part OP1 connected to one end of the shutter SHT and a second flexible electrode part OP2 connected to an opposing end of the shutter SHT.

The first flexible electrode part OP1 includes a first flexible electrode CE1 and a second flexible electrode CE2.

The first flexible electrode CE1 and the second flexible electrode CE2 are spaced apart from each other by a predetermined distance. The first flexible electrode CE1 is electrically connected to the first switching device SWD1 and receives the data voltage from the first switching device SWD1. The second flexible electrode CE2 faces the first flexible electrode CE1. The second flexible electrode CE2 is spaced apart from the first flexible electrode CE1, and is connected to the one end of the shutter SHT.

The first flexible electrode CE1 includes a first flexible beam CB1 in a beam shape and having elasticity, and a first support SP1 fixing the first flexible beam CB1 onto the second insulating substrate INS2. The second flexible electrode CE2 includes a second flexible beam CB2 in a beam shape, having elasticity and connected to the shutter SHT, and a second support SP2 fixing the second flexible beam CB2 onto the second insulating substrate INS2. As used herein, "beam" indicates an elongated member supported at opposing ends and subject to bending stresses from or in a direction perpendicular to its length.

The second flexible electrode part OP2 includes a third flexible electrode CE3 and a fourth flexible electrode CE4. The third flexible electrode CE3 and the fourth flexible electrode CE4 are spaced apart from each other by a predetermined distance. The third flexible electrode CE3 is electrically connected to the second switching device and receives the data voltage from the second switching device. The fourth flexible electrode CE4 faces the third flexible electrode CE3. The fourth flexible electrode CE4 is spaced apart from the third flexible electrode CE3, and is connected to the opposing end of the shutter SHT.

The third flexible electrode CE3 includes a third flexible beam CB3 in a beam shape and having elasticity, and a third support SP3 fixing the third flexible beam CB3 onto the second insulating substrate INS2. The fourth flexible electrode CE4 includes a fourth flexible beam CB4 in a beam shape, having elasticity and connected to the shutter SHT, and a fourth support SP4 fixing the fourth flexible beam CB4 onto the second insulating substrate INS2.

The first to fourth supports SP1, SP2, SP3 and SP4 may be provided in plural numbers, respectively. In one exemplary embodiment, for example, the first support SP1 may support the first flexible beam CB1 more stably by being provided in plural numbers.

Each of the first flexible beam CB1, the second flexible beam CB2, the third flexible beam CB3, and the fourth flexible beam CB4 (hereinafter 'flexible beams') is provided substantially in a long thin plate shape, and may be bent in plural times in order to have elasticity. If two surfaces having the largest area and facing each other in each flexible beam are denoted as a first surface and a second surface, the first surface and the second surface are provided perpendicular to an upper surface of the second insulating substrate INS2. Among surfaces parallel to the upper surface of the second insulating substrate INS2 and connecting the first surface and the second surface in each flexible beam, surfaces furthest away from and closest to the second insulating substrate INS2 are respectively referred to as an upper surface and a lower surface. Two surfaces in each flexible beam, which connect the first and second surfaces and are perpendicular to the upper surface of the second insulating substrate INS2, are referred to as side surfaces.

An insulation pattern (hereinafter the 'first insulation pattern PSV1') is provided on a surface of the each beam. The first insulation pattern PSV1 includes a dielectric material. The first insulation pattern PSV1 may include at least one material of silicon nitride, silicon oxide, and aluminum oxide.

The first insulation pattern PSV1 is provided on the surfaces of the flexible beams which may contact each other by electrical attraction. The first insulation pattern PSV1 electrically insulates two adjacent flexible beams from each other, which may be in contact with each other by electrical attraction. Therefore, an electrical short, which may be generated between the two flexible beams when the two adjacent flexible beams are in contact with each other, is reduced or effectively prevented.

The first insulation pattern PSV1 covers a portion of the surfaces of the each flexible beam. Particularly, the first insulation pattern PSV1 has an exposed portion exposing the upper surface and lower surface of the each flexible beam. Therefore, the first insulation pattern PSV1 is not provided on the upper surface and lower surface of the each flexible beam.

Also, the first insulation pattern PSV1 is not provided on the side surfaces of the flexible beam. According to the illustrated embodiment of the invention, the first insulation pattern PSV1 covers any one of the first surface and the second surface. Herein, the first insulation pattern PSV1 is provided on the surfaces of the flexible beams which may be in contact with each other by electrical attraction among the first surface and second surface of the each flexible beam.

The shutter SHT horizontally moves in a direction parallel to the second insulating substrate INS2 according to the voltage applied to the first flexible electrode part OP1 and the second flexible electrode part OP2. The overlapping of the second opening OPN2 of the shutter SHT and the first opening OPN1 of the light shielding layer LSL is controllable according to the movement of the shutter SHT. Therefore, the light from the outside indicates the gradation of black and white by passing through or not passing through the first opening OPN1 and the second opening OPN2.

The illustrated embodiment of the invention illustrates that the flexible electrode unit is provided with two parts, the first flexible electrode part OP1 and the second flexible electrode part OP2, which are connected to one end and an opposing end of the shutter SHT, but the flexible electrode unit is not limited thereto. According to another embodiment of the invention, the flexible electrode portion is one part and may be provided on only one end of the shutter SHT.

Hereinafter, an exemplary embodiment of a method of fabricating a display apparatus shown in FIG. 1 according to the invention will be described with reference to FIGS. 2 and 3.

The display apparatus of FIG. 1 according to the invention is fabricated by respectively fabricating the first substrate SUB1 and the second substrate SUB2, and disposing the first substrate SUB1 and the second substrate SUB2 to face each other.

The first insulating substrate INS1 is prepared and the light shielding layer LSL having the first opening OPN1 is formed on the first insulating substrate INS1 to fabricate the first substrate SUB1. A light shielding layer LSL is formed on the first insulating substrate INS1 and the light shielding layer LSL is patterned by using photolithography to form the light shielding layer LSL having the first opening OPN1.

FIGS. 4A to 4H are cross-sectional views sequentially illustrating an exemplary embodiment of a method of fabricating the second substrate SUB2 in the display apparatus of FIG. 1 according to the invention. For simplicity of description, FIGS. 4A to 4H will be described by focusing on portions of the first flexible electrode part OP1 and the shutter SHT. Since the second flexible electrode part OP2 is formed by substantially the same method as the first flexible electrode part OP1, the description for the second flexible electrode part OP2 will not be provided herein.

Referring to FIGS. 4A to 4H, the second insulating substrate INS2 is prepared and the first switching device SWD1, the flexible electrode unit, and the shutter SHT are formed on the second insulating substrate INS2, to fabricate the second substrate SUB2.

Figure 4A:
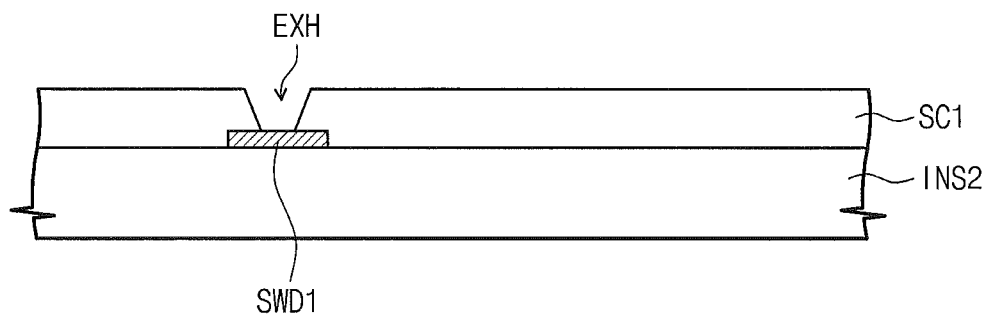
FIGS. 4A to 4H are cross-sectional views sequentially illustrating an exemplary embodiment of a method of fabricating a second substrate in the display apparatus of FIG. 1 according to the invention.

Referring to FIG. 4A, the first switching device SWD1 is formed directly on the second insulating substrate INS2, and a first sacrificial pattern SC1 is formed on the second insulating substrate INS2 on which the first switching device SWD1 is formed.

The first switching device SWD1 may be formed by using masks in plural sheets. The first sacrificial pattern SC1 is formed on the second insulating substrate INS2 and has an exposure hole EXH exposing a portion of the first switching device SWD1. For the first sacrificial pattern SC1, a first sacrificial layer is formed on the second insulating substrate INS2 on which the first switching device SWD1 is formed, and the first sacrificial layer is patterned by using a photolithography process.

Figure 4B:
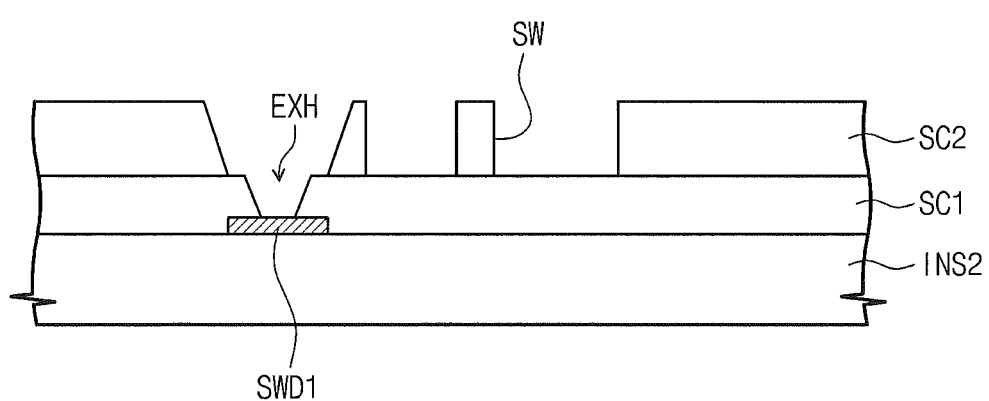

Referring to FIG. 4B, a second sacrificial pattern SC2 is formed on the first sacrificial pattern SC1. For the second sacrificial pattern SC2, a second sacrificial layer is formed on the first sacrificial pattern SC1 and the second sacrificial layer is patterned by using a photolithography process. A portion of the second sacrificial layer is removed so that the second sacrificial layer has side walls SW perpendicular to an upper surface of the second insulating substrate INS2. An upper surface of the first sacrificial pattern SC1 is exposed in a region where the second sacrificial layer is removed and is on the same plane.

The photolithography process was carried out twice in order to form the first sacrificial pattern SC1 and the second sacrificial pattern SC2 in the illustrated embodiment of the invention, but it is not limited thereto. According to another embodiment of the invention, the first sacrificial pattern SC1 and the second sacrificial pattern SC2 may be formed by a single photolithography process using a slit mask or a diffraction mask.

Figure 4C:
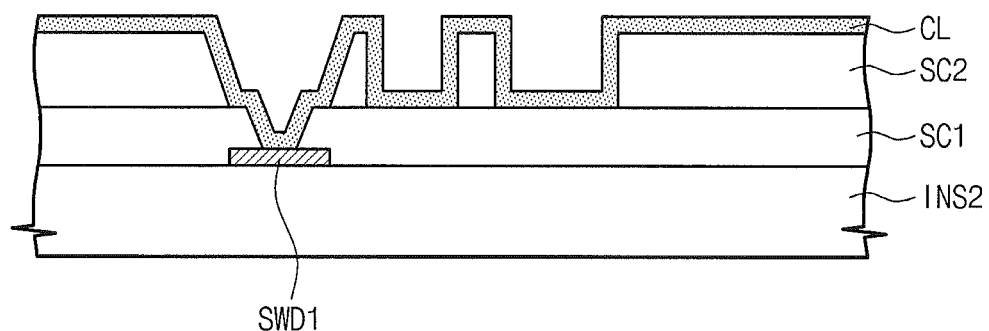

As illustrated in FIG. 4C, a conductive layer CL is formed over the second insulating substrate INS2. The conductive layer CL may include metal. According to the illustrated embodiment of the invention, the conductive layer CL may be formed of a single layer, but it is not limited thereto. According to another embodiment, the conductive layer CL may be formed of multi-layers, and for example, may be formed of double layers having a metal layer and a conductive metal oxide layer.

Figure 4D:
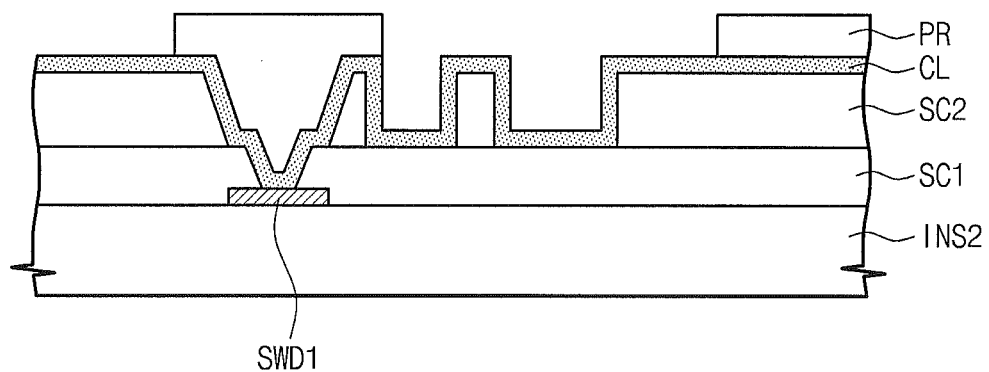

Thereafter, as illustrate in FIG. 4D, a photoresist pattern PR is formed over the second insulating substrate INS2. For the photoresist pattern PR, a photoresist layer is coated on the second insulating substrate INS2, and the photoresist layer is exposed and developed to form the photoresist pattern PR. The photoresist pattern PR is provided in a region corresponding to the support and the shutter SHT.

Figure 4E:
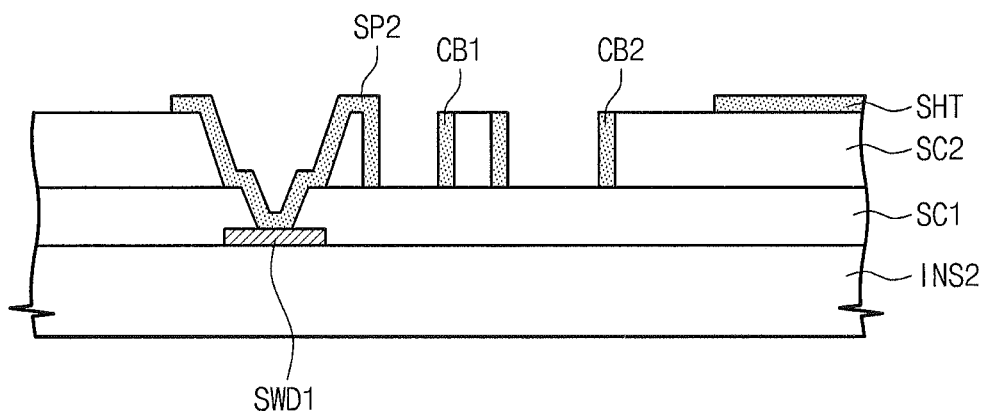

Then, as illustrated in FIG. 4E, the conductive layer CL is etched by using the photoresist pattern PR as a mask and the photoresist pattern PR is removed. As a result, the first flexible electrode CE1 including the first flexible beam CB1 connected to the first switching device SWD1 through the exposure hole EXH and the first support SP1, the second flexible electrode CE2 including the second flexible beam CB2 and the second support SP2, and the shutter SHT are formed.

The conductive layer CL is anisotropically etched in a direction perpendicular to the upper surface of the second insulating substrate INS2. By means of the anisotropic etching, the conductive layer CL disposed parallel to the upper surface of the second insulating substrate INS2 is etched, and the conductive layer CL perpendicular to the upper surface of the second insulating substrate INS2, e.g., the conductive layer CL in contact with the side walls SW, remains without being etched. As a result, the first flexible beam CB1 and the second flexible beam CB2 are fabricated in plate shapes perpendicular to the upper surface of the second insulating substrate INS2, and at least one surface of each of the first and second flexible beams CB1 and CB2 is in contact with the side walls SW.

Figure 4F:
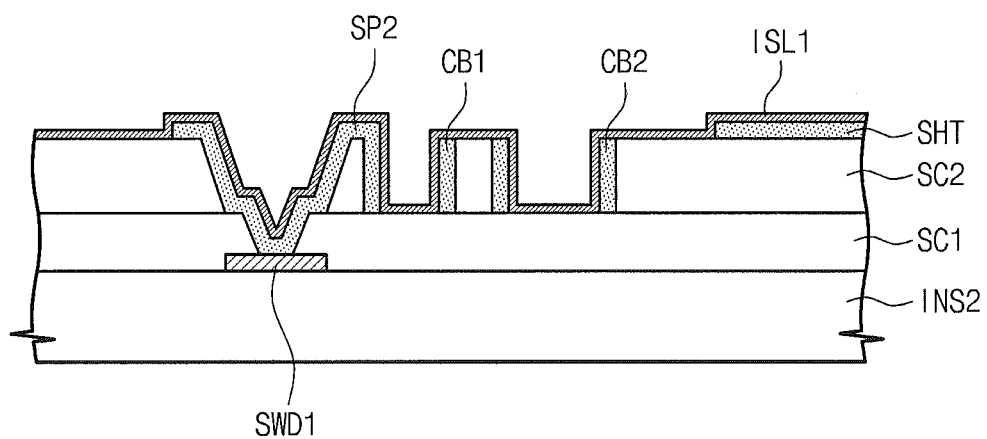

As illustrated in FIG. 4F, a first insulation layer ISL1 is formed over the second insulating substrate INS2. The first insulation layer ISL1 may be formed by depositing an insulation material over the second insulating substrate INS2 and may include at least one of silicon nitride, silicon oxide, and aluminum oxide.

Figure 4G:
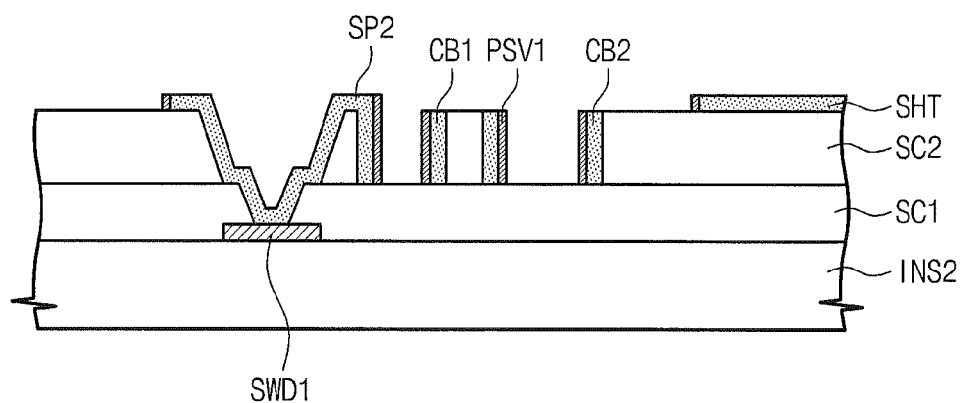

As illustrated in FIG. 4G, the first insulation layer ISL1 is anisotropically etched to form the first insulation pattern PSV1 on a portion of the flexible electrode unit. The first insulation layer ISL1 is anisotropically etched in a direction perpendicular to the upper surface of the second insulating substrate INS2. By means of the anisotropic etching, the first insulation layer ISL1 positioned parallel to the upper surface of the second insulating substrate INS2 is etched, and the first insulation layer ISL1 perpendicularly to the upper surface of the second insulating substrate INS2 is not etched and remains. As a result, the first insulation pattern PSV1 is formed on the surfaces of the first flexible beam CB1 and the second flexible beam CB2 opposite to the surfaces contacting the sidewalls SW. Also, the first insulation layer ISL1 is not formed on a region of the shutter SHT disposed parallel to the upper surface of the second insulating substrate INS2.

Figure 4H:
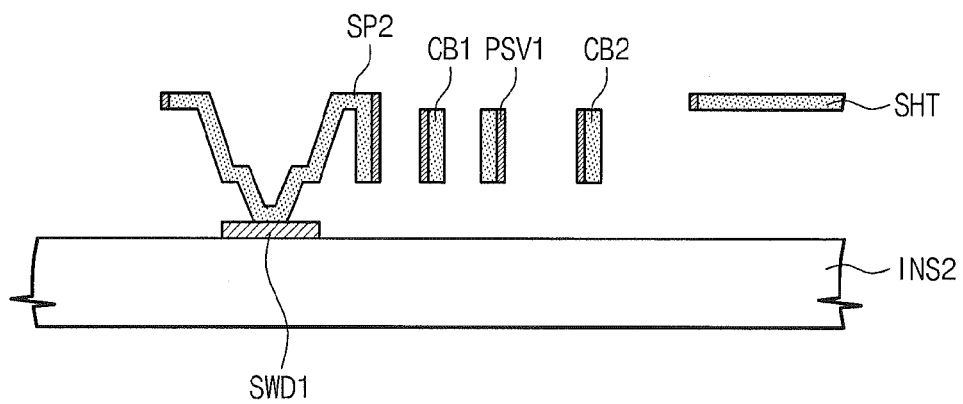

As illustrated in FIG. 4H, the first sacrificial pattern SC1 and the second sacrificial pattern SC2 are removed. The first sacrificial pattern SC1 and the second sacrificial pattern SC2 are removed by isotropic etching.

Figure 5:
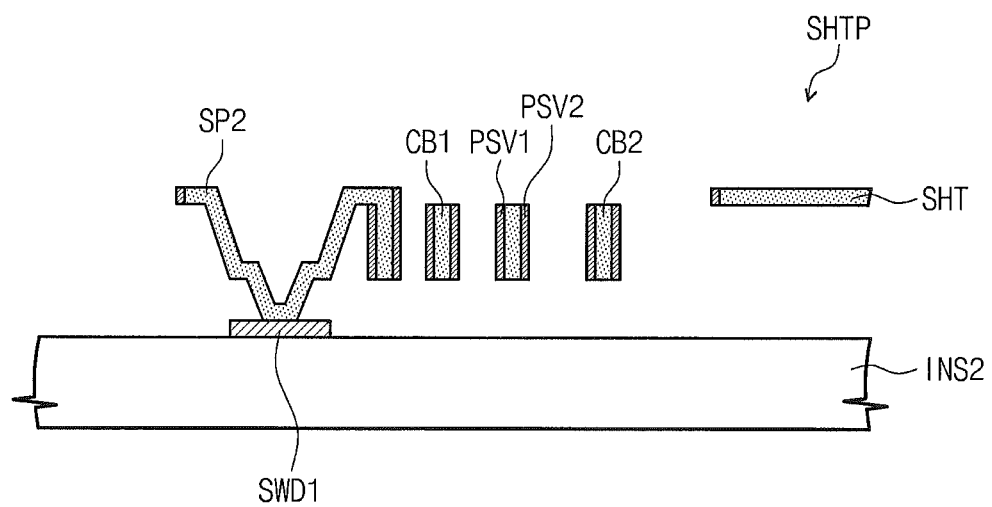
FIG. 5 is a cross-sectional view illustrating another exemplary embodiment of a display apparatus according to the invention.

FIG. 5 is a cross-sectional view illustrating another exemplary embodiment of a display apparatus according to the invention and illustrates a cross-sectional view corresponding to the cross-sectional view taken along line I-I' of FIG. 2. In order to avoid the overlapping descriptions for the display apparatus of FIG. 5, the description related to the same details as the display apparatus with reference to FIGS. 1 and 2 will be omitted.

According to the illustrated embodiment of the invention, first and second insulation patterns PSV1 and PSV2 including a dielectric material are respectively provided on opposing surfaces of each flexible beam. The first and second insulation patterns PSV1 and PSV2 may include at least one material of silicon nitride, silicon oxide, and aluminum oxide.

The first and second insulation patterns PSV1 and PSV2 are provided on the opposing surfaces of the flexible beams which may be in contact with each other by electrical attraction. The first and second insulation patterns PSV1 and PSV2 electrically insulate two adjacent flexible beams which may be in contact with each other by electrical attraction. Therefore, an electrical short, which may be generated between the two flexible beams when the two adjacent flexible beams are in contact with each other, is reduced or effectively prevented.

The first and second insulation patterns PSV1 and PSV2 cover a portion of the surfaces of the each flexible beam. Particularly, the first and second insulation patterns PSV1 and PSV2 have an exposed portion exposing the upper surface and the lower surface of the each flexible beam. Therefore, the insulation patterns are not included on the upper surface and lower surface of the each flexible beam. Herein, the first and second insulation patterns PSV1 and PSV2 cover all of the first surface and the second surface of each flexible beam.

Hereinafter, an exemplary embodiment of a method of fabricating a display apparatus shown in FIG. 5 according to the invention will be described with reference to FIGS. 2 and 3.

FIGS. 6A to 6J are cross-sectional views sequentially illustrating an exemplary embodiment of a method of fabricating the second substrate SUB2 in the display apparatus of FIG. 5 according to the invention. For simplicity of description, FIGS. 6A to 6J will be described by focusing on portions of the first flexible electrode part OP1 and the shutter SHT. Since the second flexible electrode part OP2 is formed by substantially the same method as the first flexible electrode part OP1, the description for the second flexible electrode part OP2 will not be provided herein.

Referring to FIGS. 6A to 6J, the second insulating substrate INS2 is prepared and the first switching device SWD1, the flexible electrode unit and the shutter SHT are formed on the second insulating substrate INS2 to fabricate the second substrate SUB2.

Figure 6A:
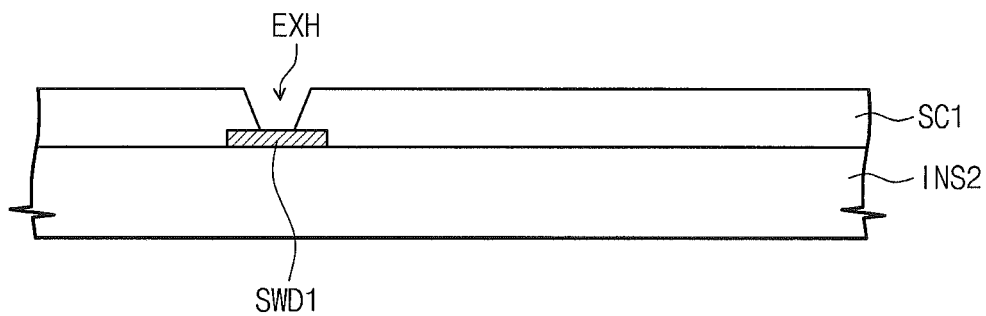
FIGS. 6A to 6J are cross-sectional views sequentially illustrating an exemplary embodiment of a method of fabricating a second substrate in the display apparatus of FIG. 5 according to the invention.
Figure 6B:
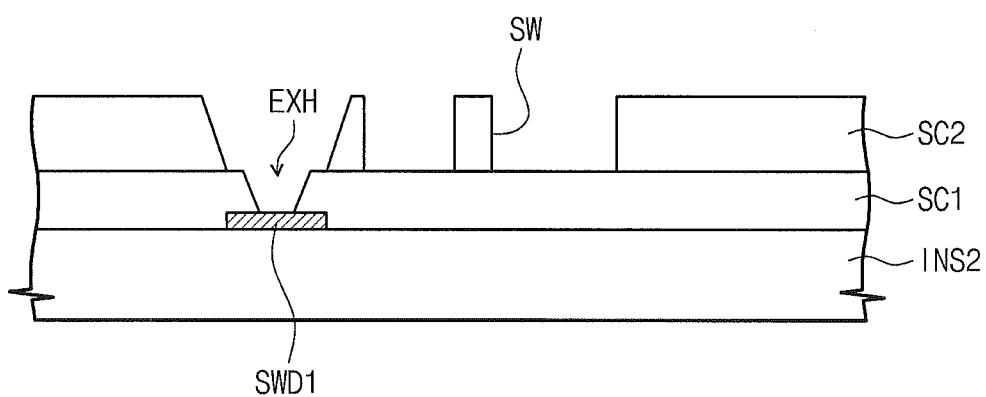

Referring to FIGS. 6A and 6B, the first switching device SWD1 is formed directly on a second insulating substrate INS2, and the first sacrificial pattern SC1 and the second sacrificial pattern SC2 are formed on the second insulating substrate INS2 on which the first switching device SWD1 is formed.

Figure 6C:
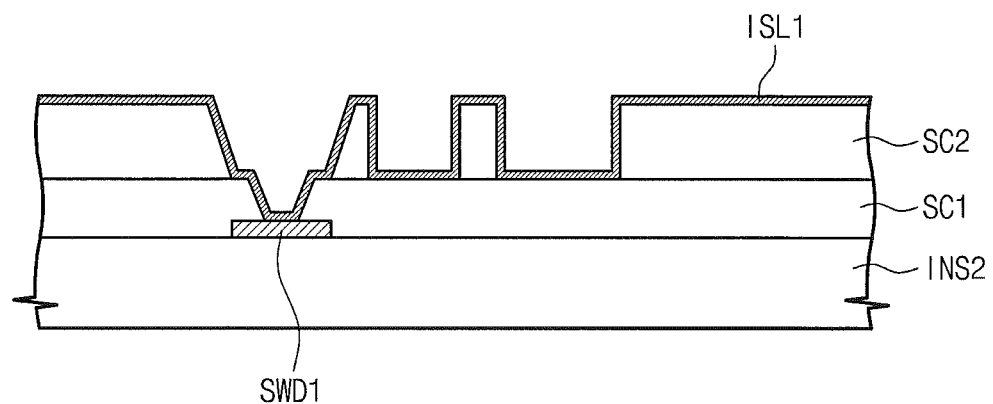

Then, as illustrated in FIG. 6C, the first insulation layer ISL1 is formed on the second insulating substrate INS2, and overlapping all exposed surfaces of the first and second sacrificial patterns SC1 and SC2, and the first switching device SWD1. An insulation material may be deposited on the second insulating substrate INS2 to form the first insulation layer ISL1, and the first insulation layer ISL1 may include at least one of silicon nitride, silicon oxide, and aluminum oxide.

Figure 6D:
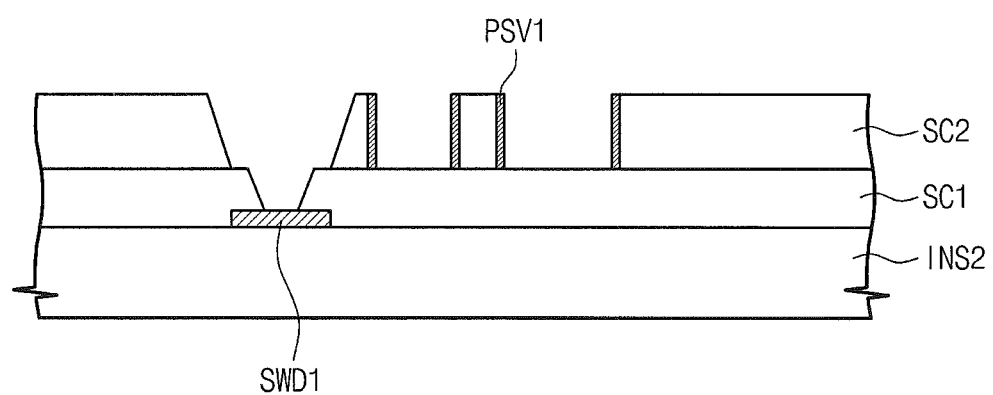

As illustrated in FIG. 6D, the first insulation layer ISL1 is anisotropically etched to form the first insulation pattern PSV1 on a portion of the flexible electrode unit. The first insulation layer ISL1 is anisotropically etched in a direction perpendicular to an upper surface of the second insulating substrate INS2. By means of the anisotropic etching, the first insulation layer ISL1 positioned parallel to the upper surface of the second insulating substrate INS2 is etched, and the first insulation layer ISL1 perpendicular to the upper surface of the second insulating substrate INS2, e.g., the first insulation layer ISL1 in contact with the sidewalls SW, is not etched and remains. As a result, the first insulation pattern PSV1 is formed perpendicular to the upper surface of the second insulating substrate INS2, and at least one surface of the first insulation pattern PSV1 is in contact with the sidewalls SW of the second sacrificial pattern SC2.

Figure 6E:
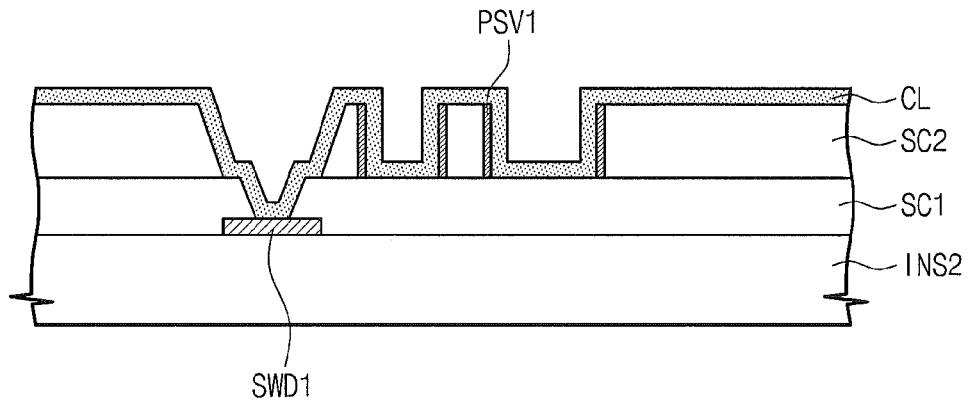

As illustrated in FIG. 6E, the conductive layer CL is formed over the second substrate SUB2. The conductive layer CL may include metal. According to the illustrated embodiment of the invention, the conductive layer CL may be formed of a single layer, but it is not limited thereto. According to another embodiment, the conductive layer CL may be formed of multi-layers, and for example, may be formed of double layers having a metal layer and a conductive metal oxide layer.

Figure 6F:
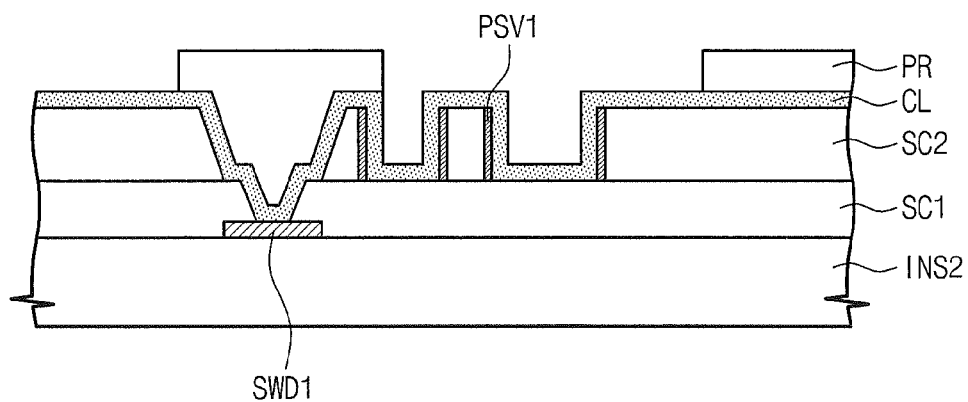

As illustrate in FIG. 6F, a photoresist pattern PR is formed over the second insulating substrate INS2. A photoresist layer is coated on the second insulating substrate INS2, and the photoresist layer is exposed and developed to form the photoresist pattern PR. The photoresist pattern PR is provided in a region corresponding to the support and the shutter SHT.

Figure 6G:
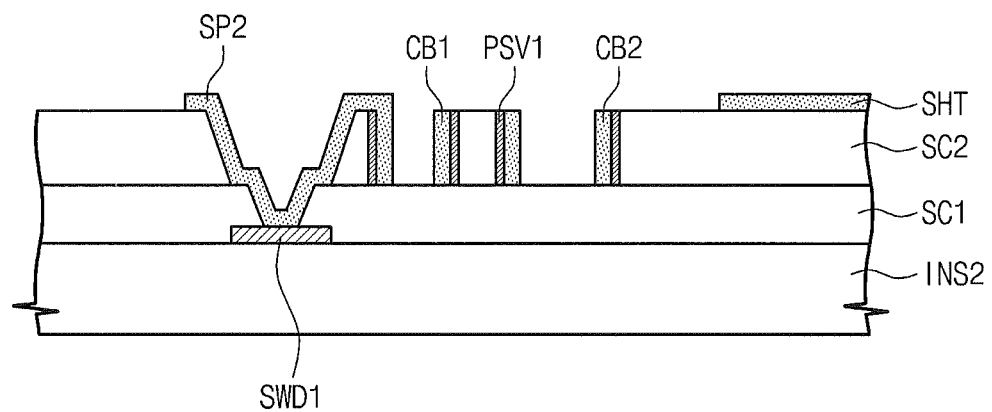

Then, as illustrated in FIG. 6G, the conductive layer CL is etched by using the photoresist pattern PR as a mask and the photoresist pattern PR is removed. As a result, the first flexible electrode CE1 including the first flexible beam CB1 connected to the first switching device SWD1 through the exposure hole EXH and the first support SP1, the second flexible electrode CE2 including the second flexible beam CB2 and the second support SP2, and the shutter SHT are formed.

The conductive layer CL is anisotropically etched in a direction perpendicular to the upper surface of the second insulating substrate INS2. By means of the anisotropic etching, the conductive layer CL disposed parallel to the upper surface of the second insulating substrate INS2 is etched, and the conductive layer CL perpendicular to the upper surface of the second insulating substrate INS2, e.g., the conductive layer CL in contact with the first insulation pattern PSV1, remains without being etched. As a result, the first flexible beam CB1 and the second flexible beam CB2 are fabricated in plate shapes perpendicular to the upper surface of the second insulating substrate INS2, and at least one surface of the respective first flexible beam CB1 and second flexible beam CB2 is in contact with the first insulation pattern PSV1.

Figure 6H:
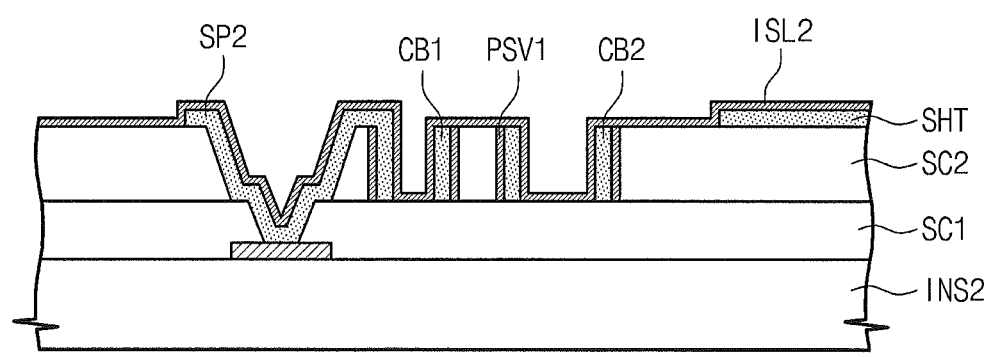

As illustrated in FIG. 6H, a second insulation layer ISL2 is formed over the second insulating substrate INS2. The second insulation layer ISL2 may be formed by depositing an insulation material over the second insulating substrate INS2 and may include at least one of silicon nitride, silicon oxide, and aluminum oxide.

Figure 6I:
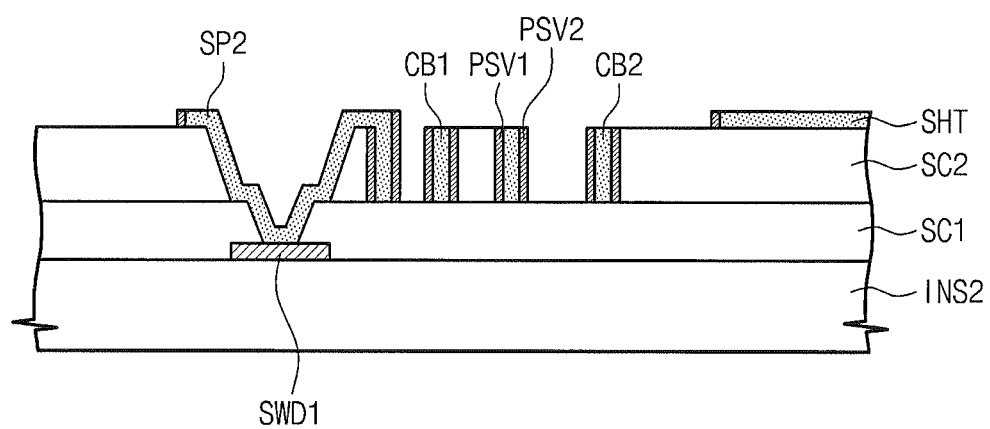

Then, as illustrated in FIG. 6I, the second insulation layer ISL2 is anisotropically etched to form the second insulation pattern PSV2 on a portion of the flexible electrode unit. The second insulation layer ISL2 is anisotropically etched in a direction perpendicular to the upper surface of the second insulating substrate INS2. By means of the anisotropic etching, the second insulation layer ISL2 positioned parallel to the upper surface of the second insulating substrate INS2 is etched, and the second insulation layer ISL2 perpendicular to the upper surface of the second insulating substrate INS2 is not etched and remains. As a result, among the exposed surfaces of the first flexible beam CB1 and the second flexible beam CB2, the second insulation pattern PSV2 is formed on the surfaces opposite to the surfaces on which the first insulation pattern PSV1 is formed. Also, the insulation layer is not formed on a region of the shutter SHT disposed parallel to the upper surface of the second insulating substrate INS2.

Figure 6J:
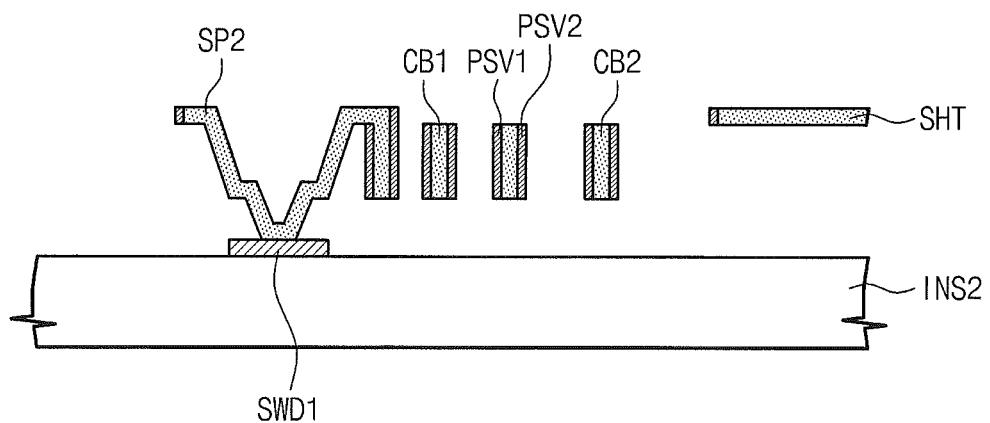

As illustrated in FIG. 6J, the first sacrificial pattern SC1 and the second sacrificial pattern SC2 are removed. The first sacrificial pattern SC1 and the second sacrificial pattern SC2 are removed by isotropic etching.

Since insulation patterns are only formed on portions of flexible beams in the display apparatuses which are fabricated by the fabricating methods according to the illustrated exemplary embodiments, abnormal operations of shutters caused by the deformation of the insulation patterns are reduced. Also, since the insulation patterns are only formed on the portions of the flexible beams, operations of the shutters are possible with a low operating voltage by increasing the flexibilities of the flexible beams.

Hereinafter, differences between a general display apparatus and the display apparatuses according to the embodiments of the invention will be described with reference to a simulation photograph and a graph.

First, the general display apparatus is described. A flexible beam and shutter are formed, and then the final general display apparatus is formed by depositing an insulation layer on entire surfaces of the flexible beam and the shutter. Therefore, a structure is obtained, in which the insulation layer covers the entire surface of the flexible beam and a large portion of the shutter.

Figure 7:
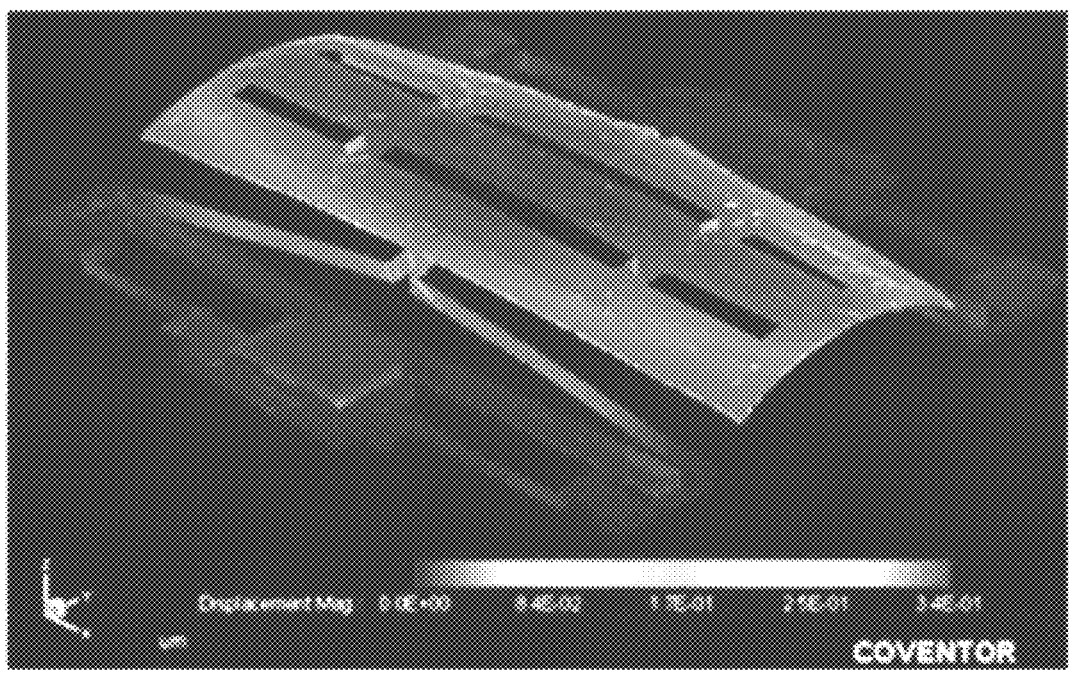
FIG. 7 is a photograph showing deformation degrees of a shutter and a flexible beam after depositing an insulation layer in a general display apparatus.

FIG. 7 is a photograph simulating deformation degrees of the shutter and the flexible beam after depositing the insulation layer entire surfaces of the flexible beam and the shutter in the general display apparatus.

Figure 8:
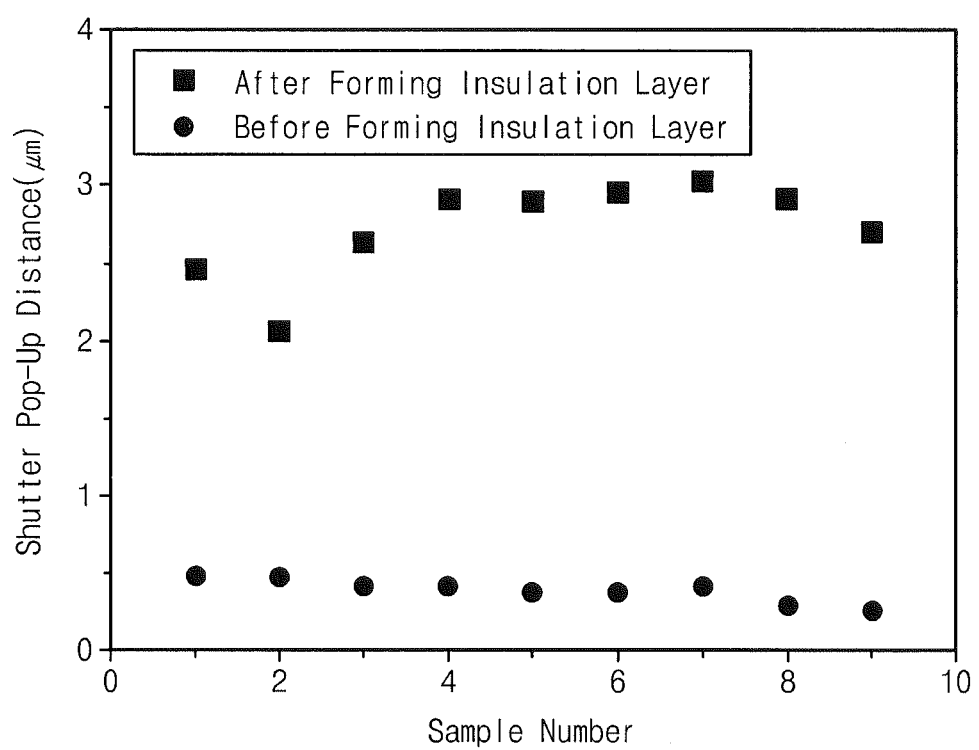
FIG. 8 is a graph showing a pop-up distance of a shutter before depositing an insulation layer on a shutter and a flexible beam and the pop-up distance of the shutter after depositing the insulation layer on the shutter and the flexible beam in the general display apparatus.

FIG. 8 is a graph showing a pop-up distance (e.g., deviation) in micrometers (μm) of the shutter before depositing the insulation layer on the shutter and the flexible beam and the pop-up distance of the shutter after the depositing of the insulation layer on entire surfaces of the shutter and the flexible beam in the general display apparatus. The pop-up distance denotes the actual distance the actually fabricated shutter deviated from the second insulating substrate when the designed distance of the shutter from the second insulating substrate is set to be zero.

According to the general display apparatus, since the insulation layer covers most of the flexible beam and the shutter, pop-up or pop-down phenomena of the flexible beam and the shutter are easily generated. The pop-up or pop-down phenomena denote that the shutter and the flexible beam are mechanically deformed by a high process temperature during the deposition of the insulation layer and the stress of the insulation layer deposited. When the pop-up or pop-down phenomena occur, operation of the general display apparatus may be difficult because the shutter and/or the flexible beam becomes too close to the first insulating substrate or the second insulating substrate, or is even in contact with the first insulating substrate or the second insulating substrate.

Referring to FIGS. 7 and 8, a pop-up phenomenon is observed in the shutter in the case of the general display apparatus, and at this time, a pop-up distance was about 3 μm or more.

Subsequently, the general display apparatus and the display apparatuses according to the embodiments of the invention are compared as follows.

Figure 9A:
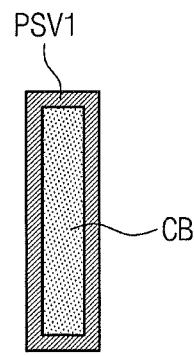
FIGS. 9A to 9C are cross-sectional views of flexible beams in the general display apparatus and the display apparatuses according to embodiments of the invention.
Figure 9B:
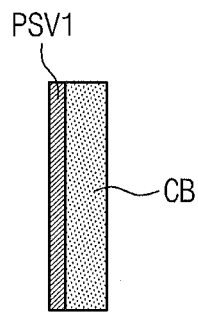
Figure 9C:
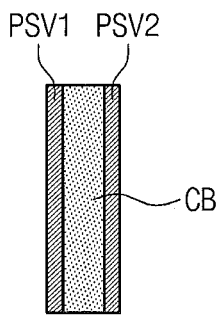
Figure 10A:
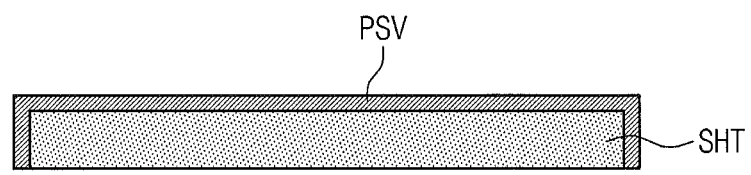
FIGS. 10A to 10C illustrate cross-sections of shutters in the general display apparatus and the display apparatuses according to the embodiments of the invention.
Figure 10B:
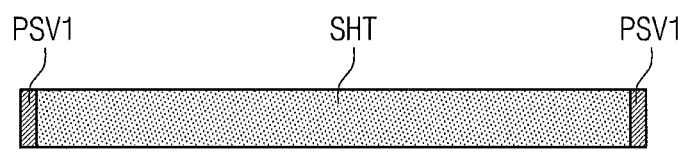
Figure 10C:
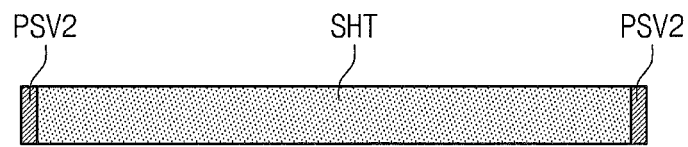

FIGS. 9A to 9C illustrate cross-sections of the flexible beams according to the general display apparatus, and the embodiments shown in FIGS. 3 and 5 of the invention, and FIGS. 10A to 10C illustrate cross-sections of the shutters, respectively. FIGS. 9A and 10A are the cross-sections of the flexible beam and the shutter in the general display apparatus, respectively. FIGS. 9B and 10B are the cross-sections of the flexible beam and the shutter according to the illustrated embodiment in FIG. 3 of the invention, respectively. FIGS. 9C and 10C are the cross-sections of the flexible beam and the shutter according to the illustrated embodiment in FIG. 5 of the invention, respectively. Herein, the cross-sectional views of FIGS. 9A to 9C correspond to the cross-sectional view taken along line II-II' of FIG. 2, and the cross-sectional views of FIGS. 10A to 10C correspond to the cross-sectional view taken along line III-III' of FIG. 2.

Referring to FIGS. 9A to 9C, an insulation pattern according to the general display apparatus covers an entire surface of the flexible beam, an insulation pattern according to the illustrated embodiment in FIG. 3 of the invention covers one surface of opposing surfaces of the flexible beam, and an insulation pattern according to the illustrated embodiment in FIG. 5 of the invention covers both of opposing surfaces of the flexible beam. According to the illustrated embodiments in FIGS. 3 and 5, the insulation patterns are not on the upper surface and the lower surface of the flexible beam.

Referring to FIGS. 10A to 10C, an insulation pattern is on an upper surface of the shutter, e.g., a surface parallel to an upper surface of the second insulating substrate according to the general display apparatus. The insulation pattern covers all the upper surface of the shutter. According to the illustrated embodiments in FIGS. 3 and 5, insulation patterns are not on the upper surfaces of the shutters, and first and second insulation patterns are provided on both of opposing sides of the shutters. However, since the shutters are a thin-plate shape, the areas of the sides are very small. Therefore, the result is not much different from the case where the second insulation patterns are substantially omitted.

Figure 11:
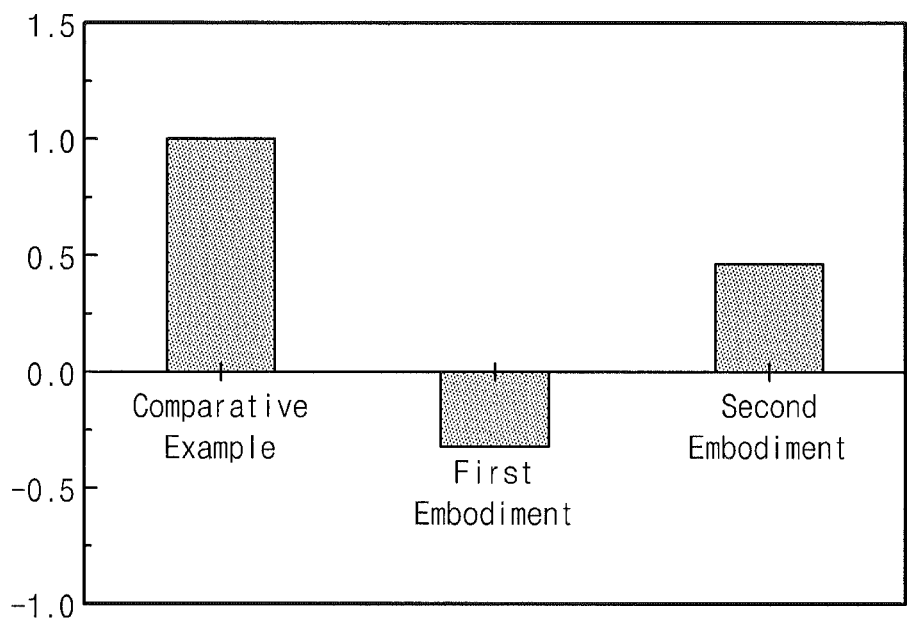
FIG. 11 is a bar graph showing pop-up distances of the shutters as relative values in the general display apparatus and the display apparatuses according to the embodiments of the invention.

FIG. 11 is a bar graph showing pop-up distances of the shutters as relative values in the general display apparatus, and the display apparatuses according to the illustrated embodiments of the invention. In FIG. 11, the pop-up distance of the shutter in the general display apparatus is represented by Comparative Example. The pop-up distances of the shutter in the illustrated embodiments in FIGS. 3 and 5 are represented by First Embodiment and Second Embodiment, respectively.

Referring to FIG. 11, when the pop-up distance in the general display apparatus is denoted as 1, the pop-up distances according to the illustrated embodiments in FIGS. 3 and 5 of the invention were about −0.3 and about 0.4, respectively. As illustrated in FIG. 11, the pop-up phenomena in the illustrated embodiments in FIGS. 3 and 5 of the invention were decreased when compared to the general display apparatus. It is considered that since insulation layers are only on portions of the flexible electrodes and the shutters in the display apparatuses according to the illustrated embodiments of the invention, the deformation caused by the insulation layers is decreased.

Figure 12:
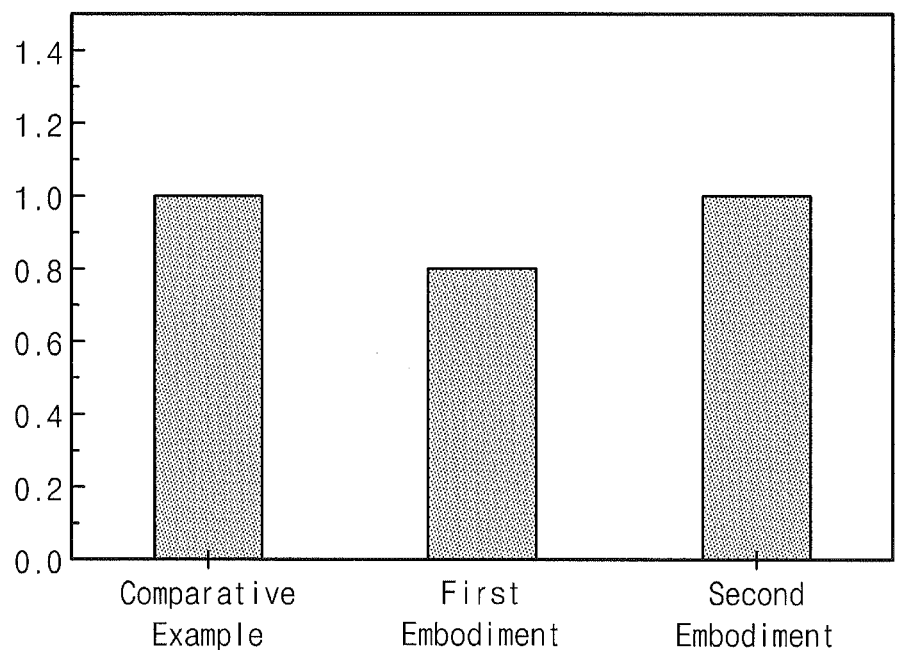
FIG. 12 is a bar graph showing operating voltage values in the general display apparatus and the display apparatuses according to the embodiments of the invention.

FIG. 12 is a bar graph showing operating voltage values in the general display apparatus and the display apparatuses according to the illustrated embodiments in FIGS. 3 and 5 of the invention. The operating voltage is the minimum voltage applied to the first flexible electrode enabling the shutter to move. In FIG. 12, the operating voltages in the illustrated embodiments in FIGS. 3 and 5 of the invention were decreased or maintained substantially at the same level when compared to the general display apparatus. It is considered that since the insulation layers are only on the portions of the flexible electrodes in the display apparatuses according to the illustrated embodiments of the invention, the flexibility of the flexible electrodes are increased. Particularly, in the embodiment of the display apparatus in FIG. 3 of the invention, the stress caused by the insulation layer is much smaller than that of a typical flexible beam because the insulation pattern is formed only on one of two opposing surfaces of the flexible beam. Therefore, the operation of the shutter is possible even with a small operating voltage.

Exemplary embodiments of a display apparatus according to the invention display high-quality images because of a decrease in abnormal operations, and can be operated even with a low operating voltage.

While the invention has been particularly shown and described with reference to exemplary embodiments thereof, it will be understood by those of ordinary skill in the art that various changes in form and details may be made therein without departing from the spirit and scope of the invention as defined by the following claims.

Thus, to the maximum extent allowed by law, the scope of the invention is to be determined by the broadest permissible interpretation of the following claims and their equivalents, and shall not be restricted or limited by the foregoing detailed description.

What is claimed is:

1. A display apparatus comprising:
   a first insulating substrate;
   a light shielding layer on the first insulating substrate and including a first opening which transmits a light therethrough;
   a second insulating substrate which faces the first insulating substrate;
   a shutter including a second opening which corresponds to the first opening; and
   a first flexible electrode part which is connected to one end of the shutter, wherein the first flexible electrode part causes the shutter to move such that the light is transmitted or blocked,
   wherein the first flexible electrode part comprises:
      a first flexible electrode on the second insulating substrate and to which a first voltage is applied, the first flexible electrode comprising an upper surface and a lower surface which are parallel to an upper surface of the second insulating substrate;
      a second flexible electrode on the second insulating substrate, connected to the shutter, facing the first flexible electrode, and movable toward the first flexible electrode when the first voltage is applied, the second flexible electrode comprising an upper surface and a lower surface which are parallel to the upper surface of the second insulating substrate; and
      a first insulation pattern which covers portions of the first flexible electrode and the second flexible electrode to insulate the first flexible electrode from the second flexible electrode and exposes a portion of the first flexible electrode and a portion of the second flexible electrode, respectively.

2. The display apparatus of claim 1, wherein
   the first flexible electrode comprises a first flexible beam, and a first support which supports the first flexible beam suspended over the second insulating substrate,
   the second flexible electrode comprises a second flexible beam which faces the first flexible beam, and a second support which supports the second flexible beam suspended over the second insulating substrate, and
   each of the first flexible beam and the second flexible beam further comprises a first surface, and a second surface which opposes the first surface, which are perpendicular to the upper surface of the second insulating substrate, wherein the second surfaces of the first flexible beam and the second flexible beam face each other.

3. The display apparatus of claim 2, wherein the first insulation pattern covers at least one of the first surfaces and the second surfaces.

4. The display apparatus of claim 3, wherein
   the upper surface and the lower surface respectively connect the first surface and the second surface, and
   the first insulation pattern includes an exposed portion which exposes the upper surface and the lower surface.

5. The display apparatus of claim 1, wherein the first insulation pattern comprises at least one of silicon nitride, silicon oxide, and aluminum oxide.

6. The display apparatus of claim 1, further comprising a switching device on the second insulating substrate and connected to the first flexible electrode, wherein the switching device applies the first voltage to the first flexible electrode.

7. The display apparatus of claim 1, further comprising a second flexible electrode part which is connected to an opposing end of the shutter, wherein the second flexible electrode part together with the first flexible electrode part causes the shutter to move such that the light is transmitted or blocked.

8. The display apparatus of claim 7, wherein the second flexible electrode part comprises:
   a third flexible electrode on the second insulating substrate and to which a second voltage is applied, the third flexible electrode comprising an upper surface and a lower surface which are parallel to the upper surface of the second insulating substrate;
   a fourth flexible electrode on the second insulating substrate, connected to the shutter, facing the third flexible electrode, and movable toward the third flexible electrode when the second voltage is applied, the fourth flexible electrode comprising an upper surface and a lower surface which are parallel to the upper surface of the second insulating substrate; and a second insulation pattern which covers portions of the third flexible electrode and the fourth flexible electrode, and exposes the upper and lower surfaces of the third flexible electrode and the fourth flexible electrode, wherein the second insulation pattern insulates the third flexible electrode from the fourth flexible electrode.

9. The display apparatus of claim 8, further comprising:

a first switching device which applies the first voltage to the first flexible electrode; and a second switching device which applies the second voltage to the second flexible electrode, the first and second switching devices on the second insulating substrate.

\* \* \* \* \*